Figures 1, 2:
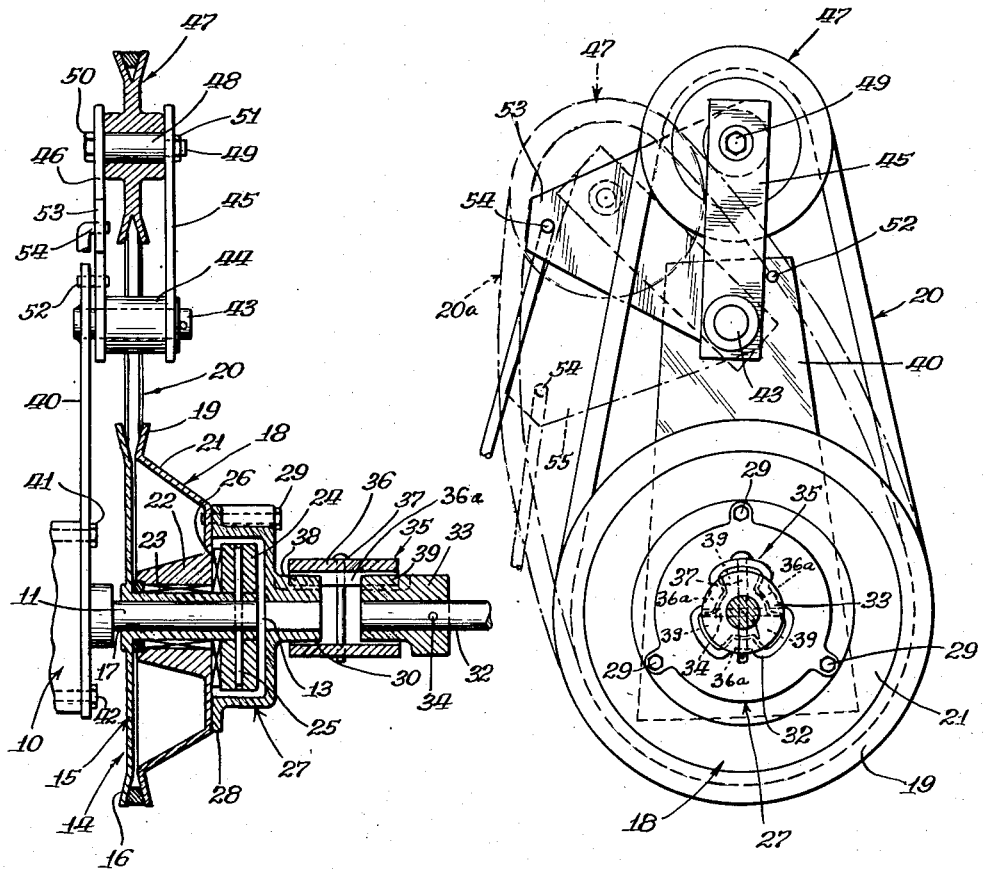

Jan. 10, 1961 H. N. JAMES 2,967,435
FRICTION CLUTCH
Filed March 14, 1958

INVENTOR.
Howell N. James
BY
Paul O. Pippel
Atty.

United States Patent Office 2,967,435
Patented Jan. 10, 1961

2,967,435

FRICTION CLUTCH

Howell N. James, Moline, Ill., assignor to International Harvester Company, Chicago, Ill., a corporation of New Jersey Filed Mar. 14, 1958, Ser. No. 721,473

6 Claims. (Cl. 74—216.5)

This invention relates to a new and improved friction clutch.

There have been and are many forms of friction clutches and yet the search continues in an attempt to find or discover a friction clutch that comprises all of the many attributes which are necessary to a successful clutch. In drives containing belts as the means of transmitting motion from one element to another there is no necessity for using in that drive a friction or slip clutch inasmuch as the drive will automatically slip by reason of the non-positive belt engagement. This is true whether a flat belt is used or a V-belt or some of the other currently modern shapes of flexible belting. The present invention employs the attributes of a belt drive into an ordinary positive drive arrangement.

An important object of this invention is to provide a clutch intermediate driving and driven aligned shafts and wherein the clutch comprises a two part V-pulley and further including belt means in said pulley with adjustable means to control the tension thereof whereupon the two part V-pulley may be effectively disengaged by loosening of the belt therein or engaged for normal frictional slippage when the belt is tightened therein.

An important object of this invention is to provide a V-pulley type friction clutch for drive mechanisms.

Another important object of this invention is to provide an overcenter belt tightening means in conjunction with a V-pulley friction clutch.

Other and further important objects and advantages of this invention will become apparent from the disclosures in the following specification and accompanying drawings:

In the drawings:

Figure 1 is a vertical sectional view taken through the V-pulley friction clutch of this invention; and Figure 2 is a front elevational view of the V-pulley friction clutch as shown in Figure 1.

As shown in the drawing the reference numeral 10 indicates generally a supporting structure within which is journally mounted a driving shaft 11. A driven shaft 32 is axially aligned with the driving shaft 11 but spaced laterally therefrom as shown in Figure 1.

The clutch of this invention as stated in the title and the objects above consists of a V-pulley of a particular design as will be hereinafter described to impart rotational drive from the driving shaft 11 to the driven shaft 32. The V-belt pulley is designated generally as 14 and includes a first half 15 having an outwardly flared outer rim portion 16 and a laterally extending internal hub or sleeve portion 17. The sleeve 17 is fixedly mounted on the driving shaft 11. The second half of the pulley designated by the numeral 18 has an oppositely flared outer rim 19 to cooperate with the flared rim 16 of the pulley portion 15 to receive a V-belt 20 therebetween. The pulley half 18 thence projects angularly in a lateral outward and radial inward direction as shown at 21 and thence turns back again toward the pulley half 15 at its inner circumference in the form of a hub or sleeve 22. The element 22 constitutes an inwardly projecting annular flange or sleeve which is journally mounted for free rotation on a radial bearing 23 disposed on the hub or sleeve 17 of the pulley half 15. A thrust collar 24 is mounted on the sleeve 17 spaced laterally outwardly of the hub or sleeve 22 of the pulley half 18. The thrust collar 24 constitutes a radially outwardly projecting annular flange. A pin 25 passes through the thrust collar 24, through the sleeve hub 17 and through the driving shaft 11. Thus as the shaft 11 rotates there is comparable and simultaneous rotation of the sleeve 17 and thus the pulley half 15. A thrust bearing 26 is interposed between the thrust collar 24 and the sleeve-like hub 22 of the pulley half 18. It should thus be visualized that the pulley halves 15 and 18 are held in axial relationship with respect to each other by the virtual nesting of the inwardly projecting annular flange 22 of the pulley half 18 over the laterally extending internal hub 17 of the pulley half 15, but there is no drive or interlocking mechanism between the pulley halves 15 and 18. As will be seen the V-belt 20 performs this interlocking of the pulley halves 15 and 18 to thereupon impart drive from the driving shaft 11 to the driven shaft 32.

A housing 27 having an annular flange 28 is fastened by means of bolts 29 to the pulley half 18 as best shown in Figure 1. The housing 27 surrounds the thrust collar and thrust bearing and has a laterally extending hub 30. This hub forms part of a coupling to impart motion to driven shaft 32. In the embodiment shown, hub 30 has a number of teeth or keys 38. Similar keys 39 are formed on a collar 33 which is fixed to driven shaft 32. The shape of the hub 30 is identical to the collar 33 and similarly the keys 38 are the same as keys 39. A loose coupling 35 is arranged and constructed to impart drive from the hub 30 of housing 27 to collar 33 and driven shaft 32. The loose coupling 35 includes a sleeve member 36 which spans the space between the hub 30 of the housing 27 and the locked collar 33 at the output side of the clutch member. The axial movement of sleeve 36 may be limited by means of a cross bolt member or pin 37. The sleeve 36 has radially inwardly projecting key members 36a which are adapted to intermesh with the key members 38 and 39 on the hubs 30 and 33. Thus as the pulley half 18 is rotated there is a comparable rotation of the housing 27 and thus the hub 30 to drive the sleeve 36 which in turn drives down through the intermeshing keys 38, 36a and 39 to the collar 33 and thence to the output or driven shaft 32.

The entire operation of the clutch of this invention depends upon the tautness of the V-belt 20. Thus the control for the clutch of this invention relates to the tightening or loosening of the belt 20. As best shown in Figure 1 a frame member 40 is bolted as at 41 and 42 to the stationary supporting structure 10 and provides a support for a shaft 43. Mounted on the shaft 43 is a sleeve or bushing member 44 which carries at both sides thereof arm or plate members 45 and 46. These arm members 45 and 46 project upwardly and form a bearing support for a V-pulley 47. The pulley is mounted on the sleeve or bushing 48 which is carried on a shaft 49 within the spaced members 45 and 46. The shaft 49 is in the form of a tube fastened to members 45 and 46 by means of bolt 50 and a locking nut 51. As best shown in Figure 2 the brackets or arms members 45 and 46 in their full lines project substantially vertically relative to the stationary frame member 40 and abut a stop member 52 fixedly mounted on the frame 40. In the full lines of the device as shown in Figure 2 the arm member 45 is slightly overcenter relative to a line drawn through the centers of shafts 11 and 43 so that the belt 20 pointing the V-pulleys 14 and 47 remains taut whereupon drive between the pulley halves 15 and 18 is accomplished. There is thus an uninterrupted driving between the driving shaft 11 and the driven shaft 32. However, slight inaccuracies in the driving or driven members may be compensated for by reason of the belt interlock between the pulley halves 15 and 18. In other words slight slippages to compensate for irregular speed may be accomplished between the pulley halves 15 and 18 by reason of their engagement by the V-belt 20. When it is desired to disengage the clutch and to stop drive from the driving shaft 11 to the driven shaft 32 the V-belt 20 is slackened by pulling the arms 45 and 46 over as a unit as shown in the dash line position of Figure 2. The plate or arm 46 has a lateral extension 53 which as shown in Figure 2 is generally triangular in shape and is equipped with a hand operated pull rod 54. When the rod 54 is pulled downwardly by an operator the arms 45 and 46 rock or shift about the shaft 43 as an axis and the unit moves to the dash line position thereof as shown at 55. This of course creates considerable slack in the V-belt 20 as shown at 20a.

In the operation of the clutch of this invention the driving pulley half 15 is engaged with the driven pulley half 18 by the V-belt 20 as a friction member. These pulley halves are engaged and disengaged by means of the idler pulley 47 mounted on an arm structure 45—46 in such a way as to tighten the belt 20 and move it slightly past center as shown in the full line position thereof in Figure 2. As previously stated when it is desired to disengage the clutch halves 15 and 18 the belt 20 is slackened by swinging the idler pulley 47 to its dash line position as shown in Figure 2. The employment of the loose coupling 35 is merely for the purpose of compensating for any misalignment between the driving and driven shafts.

Numerous details of construction may be varied throughout a wide range without departing from the principles as disclosed herein and I therefore do not oppose limiting the patent granted herein otherwise than as necessitated by the appended claims.

What is claimed is:

1. A friction clutch comprising a supporting structure, a driving member and an axially aligned driven member and including a V-pulley having its axis of rotation in axial alignment with said driving and driven members and positioned between said driving and driven members, said V-pulley carried on said driving member, said V-pulley comprising separate halves, the first pulley half joined to said driving member and arranged and constructed to be driven thereby, the second pulley half joined to said driven member, and an endless V-belt having a portion thereof mounted within and around said V-pulley, and means extending or retracting another portion of said endless V-belt remote from said portion engaging said V-pulley for tightening and/or loosening said V-belt in said V-pulley to effect a driving arrangement between said pulley halves when the V-belt is tight and a non-driving arrangement between said pulley halves when the V-belt is loose.

2. A device as set forth in claim 1 in which said first pulley half is provided with a laterally extending internal sleeve hub, and said second pulley half having a lateral outward and radial inward projection and these turning laterally inwardly forming a sleeve hub nesting over said laterally extending internal sleeve hub of the first pulley half.

3. A friction clutch comprising a supporting structure, a driving shaft journally carried in said supporting structure, a driven shaft in axial alignment with and spaced apart from said driving shaft, a housing journally carried over said driving shaft, said housing receiving and drivingly engaging said driven shaft, a first V-pulley half carried on said driving shaft, a second V-pulley half affixed to said housing, said first and second V-pulley halves cooperating to form a complete V-belt pulley, means preventing axial separation of said first and second V-pulley halves, a V-belt mounted in said V-belt pulley, means for tightening or loosening said V-belt to effect drive or to interrupt drive from the first V-pulley half to the second V-pulley half.

4. A device as set forth in claim 3 in which said means preventing axial separation includes an outwardly projecting annular collar spaced axially from and made integral with said first V-pulley half, and said second pulley half having an inwardly projecting annular flange between said first V-pulley half and said outwardly projecting annular collar.

5. A device as set forth in claim 3 in which said means for tightening or loosening said V-belt includes a bracket hingedly mounted on said supporting structure, an idler pulley mounted on said bracket and said V-belt also mounted in said idler pulley and arranged in one position of said bracket to make said V-belt taut and in another position of said bracket to loosen said V-belt.

6. A device as set forth in claim 5 in which the first position of said bracket constitutes an over-center locked position thereof.

References Cited in the file of this patent

UNITED STATES PATENTS

| | | |
|---|---|---|
| 1,260,239 | Million | Mar. 19, 1918 |
| 2,097,559 | Brownlee | Nov. 2, 1937 |
| 2,244,169 | Miller | June 3, 1941 |
| 2,254,592 | Berkeley | Sept. 2, 1941 |
| 2,256,312 | Cregier | Sept. 16, 1941 |
| 2,298,535 | Krag | Oct. 13, 1942 |
| 2,770,338 | Penney | Nov. 13, 1956 |
| 2,784,604 | Kraus | Mar. 12, 1957 |

FOREIGN PATENTS

| | | |
|---|---|---|
| 21,415 | Great Britain | of 1907 |